United States Patent Office 3,165,381
Patented Jan. 12, 1965

3,165,381
PROCESS OF PRODUCING BORANES
Herbert Jenkner, Hannover-Wuelfel, Germany, assignor to Kali-Chemie Aktiengesellschaft, Hannover, Germany, a corporation of Germany
No Drawing. Filed Mar. 19, 1962, Ser. No. 180,814
Claims priority, application Germany, Mar. 20, 1961, K 43,234
4 Claims. (Cl. 23—204)

The present invention relates to a process of producing boranes and more particularly to a process of producing polyboranes and their substitution products.

It is known to produce diborane by reacting boron trichloride and monosilane. The reaction is carried out in the presence of methyl radicals which are obtained by photochemical decomposition of diazomethane. This process, however, is not suitable for large scale production of diborane because the explosive diazomethane can be handled only with difficulty. Furthermore, considerable amounts of non-volatile compounds are formed. The yield of diborane is rather low. The diborane is also contaminated by methane which can be separated from the gas mixture only with great difficulty.

It is one object of the present invention to provide a simple and effective process of producing diborane and higher liquid boranes such as pentaborane and the like, as well as partly substituted boranes.

Other objects of the present invention and advantageous features thereof will become apparent as the description proceeds.

In principle the process according to the present invention consists in reacting inorganic silanes with boron halogenides in the presence of a catalyst capable of specifically activating the formation of boranes. Catalysts which are especially suitable for the process according to the present invention are large surface catalysts. Especially suitable has proved to be activated charcoal in the form of particles having a diameter of 1 mm. to 3 mm. It is of importance that such large surface catalysts are as free as possible of oxygen and moisture in order to avoid side reactions. A catalyst, which is especially useful for the present reaction, can be obtained, for instance, by heating commercially available activated charcoal at a temperature between 200° C. and 400° C. in a vacuum for one hour to ten hours. When using such a catalyst in the reaction of inorganic silanes with boron halogenides, the resulting borane compounds are obtained in a high yield and are substantially free of methane.

The reaction according to the present invention proceeds, for instance, according to the following equation:

$$2BCl_3 + 2SiH_4 \rightarrow B_2H_6 + 2SiCl_3H$$

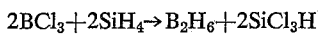

The reaction is preferably carried out under atmospheric pressure conditions. The reaction sets in with a satisfactory speed of reaction even at room temperature. Since the reaction proceeds strongly exothermically, it is usually required to intensely cool the reaction vessel and/or to dilute the reactants by the addition of inert gases such as hydrogen, nitrogen, or noble gases such as argon. Dilution with inert liquids is also possible.

Preferably the reaction is carried out at a temperature between about 20° C. and about 150° C. Best results are achieved at a temperature between 20° C. and 50° C. When reacting at a temperature exceeding 80° C., not only diborane but also higher liquid boranes such as pentaborane are formed. An increase of the reaction temperature above 150° C. is to be avoided because the resulting borane are further decomposed thermally at such higher temperatures. The reaction temperature can readily be controlled by the speed of adding the reactants and diluting agents.

The process according to the present invention is especially suitable for the production of diborane in a high yield. On passing a gas mixture of four parts by volume of boron trihalogenide and three parts by volume of monosilane over dehydrated and degasified activated charcoal at a temperature below 50° C., the gas mixture withdrawn after reaction of said reactants consists of diborane and tetrahalogeno silane, partly also of trihalogeno silane, and contains usually small amounts of halogeno boranes. To produce substantially pure diborane, the resulting diborane which may contain halogen is passed through washing vessels or scrubbers containing organo silanes such as triethyl silane. Any halogeno silane present in the reaction product is retained by said scrubbers and the residual halogeno boranes are converted into diborane which is withdrawn together with the initially present diborane. In place of organo silanes, there may be used in these scrubbers N-trialkyl borazanes such as N-triethyl borazane. It is also possible and sometimes of advantage to combine and use both organo silanes and N-trialkyl borazanes.

When varying the proportion of four parts by volume of boron trihalogenide to three parts by volume of monosilane, there are obtained, in addition to diborane, silanes containing varying amounts of halogen. Thus, for instance, when using monosilane in a considerable excess, there is formed monohalogeno silane (SiH$_3$Cl). A small excess of monosilane produces especially trihalogeno silane.

The process according to the present invention has the great advantage over the known process that, with the exception of the halogeno silanes which can readily be separated, no further additional reaction products are formed so that complicated purification of the diborane is avoided.

The halogeno silanes which are formed as by-products can readily be reconverted into silanes, for instance, according to the process of German Patent No. 1,055,511 by means of sodium hydride which has been activated by the presence of organo-boron or organo-aluminum compounds of the formula $$MR_xR'_y$$

In said formula

M indicates boron or aluminum;
R indicates lower alkyl, lower alkoxy, or lower phenoxy;
R' indicates hydrogen or halogen;
x is an integer from 1 to 3, and
x+y together amount to 3.

The resulting silanes can again be reacted with boron halogenides. Thus, the silanes may be considered as hydrogen transfer agents. It may be pointed out that direct reaction of the boron halogenide with sodium hydride under the low temperature conditions of this process is not possible.

The term "inorganic silanes" used in the specification and the claims annexed thereto not only comprises monosilane which is the preferred hydrogenating agent but also halogeno silanes such as dihalogeno silane (SiH$_2$Cl$_2$).

Boron halogenide compounds useful in the process according to the present invention are the boron trihalogenides preferably boron trichloride and boron tribromide. It is also possible to react a boron halogenide which contains one or two hydrogen atoms, such as monochloroborane or dichloroborane. When using boron halogenide compounds which are partly substituted by organic radicals, i.e. boron halogenides of the formula $$BX_nR_{3-n}$$

wherein

X is halogen;
R is a lower alkyl or aryl; and
$n$ is the integer 1 or 2, the corresponding substituted organo boranes are obtained. By using partly substituted boron halogenide and the inorganic silane in a corresponding stoichiometric proportion, quantitative reaction is assured.

Boranes are useful as starting materials for the preparation or organo-boron compounds or of metal boron hydrides. They may also be employed as motor fuels and as additives to motor fuels of high energy content. Furthermore, boron of the highest degree of purity can be prepared from the diborane obtained according to the present invention by thermal decomposition. Such boron is especially useful in electronic devices.

The following example serves to illustrate the present invention without, however, limiting the same thereto.

*Example*

A mixture of 93 g. of boron trichloride and 18 g. of monosilane are passed, within three hours, through a tube which is filled with 15 g. of degasified and dehydrated activated charcoal as it is sold, for instance, by the firm E. Merck A.G. of Darmstadt, Germany. Care is taken that the exothermic reaction which sets in immediately is kept at a temperature below about 50° C. by external cooling. The emerging gas mixture is passed through a condenser kept at −78° C. wherein the resulting chloro silanes are condensed and liquefied, while diborane passes therethrough. The crude diborane obtained thereby is conducted through another condenser kept at −78° C., thereafter through a scrubber containing triethyl silane, and finally into triethylamine. 76 g. of N-triethyl borazane are obtained corresponding to a yield of diborane of about 86% of the theoretical yield. The condensed chloro silane mixture consists mainly of trichloro silane (about 80%) and some dichloro silane and tetrachloro silane.

When replacing monosilane in the above given example by halogeno silanes such as dichloro silane, and otherwise proceeding as described in the above given example, it is also possible to produce diborane in a high yield.

When the temperature is increased to 70–150° C., the yield of diborane is reduced but the yield of pentaborane is increased. At a temperature of 110° C. the yield of diborane is 30% and of pentaborane is 70% of the total amount of formed boranes. Additional admixture of hydrogen to monosilane in equivalent volumes results in a higher yield of diborane of about 90%.

In place of boron trichloride used in the preceding example, there may be employed equimolecular amounts of boron tribromide while otherwise the procedure is the same as described in said example. When using methyl boron dichloride or dimethyl boron chloride, phenyl boron dichloride, diphenyl boron bromide, ethyl boron dichloride, diethyl boron chloride, and other substituted boron halogenides, reaction with monosilane yields the corresponding methyl borane, dimethyl borane, ethyl borane, diethyl borane, phenyl borane, diphenyl borane and similar compounds.

Of course, many changes and variations in the proportions of boron halogenide, inorganic silanes, and diluting agents, in the reaction conditions, temperature and duration, in the processes of recovering diborane from the reaction products and of purifying the same, and the like may be made by those skilled in the art in accordance with the principles set forth herein and in the claims annexed hereto.

I claim:

1. In a process of producing boranes, the steps which comprise reacting an inorganic silane selected from the group consisting of monosilane and halogeno monosilanes with a boron halogenide of the formula $$BX_nR_xR'_y$$

wherein
X indicates a halogen;
R indicates a member selected from the group consisting of alkyl and aryl;
R' indicates a member selected from the group consisting of hydrogen, alkyl, and aryl;
$n$ indicates an integer from 1 to 3;
$x$ indicates the integers 0 to 2;
$y$ indicates the integers 0 to 2; and
$n+x+y$ together being the integer 3;
at a temperature between about 20° C. and about 150° C. in the presence of dehydrated activated charcoal as catalyst.

2. The process according to claim 1, wherein the activated charcoal used as catalyst is an activated charcoal which has been dried in a vacuum by heating at a temperature between about 200° C. and about 400° C. for one hour to ten hours.

3. The process according to claim 1, wherein the reaction temperature is a temperature between about 20° C. and about 50° C.

4. In a process of producing diborane of highest purity, the steps which comprise reacting boron trichloride with monosilane at a temperature between about 20° C. and about 50° C. in the presence of dried activated charcoal as catalyst, conducting the resulting gas mixture through a condenser cooled to a temperature of about +78° C. to liquefy and separate the chloro silanes, and passing the gaseous crude diborane through a scrubber provided with a washing liquid selected from the group consisting of organo silanes and N-trialkyl borazanes.

References Cited by the Examiner

UNITED STATES PATENTS

| | | | |
|---|---|---|---|
| 2,994,586 | 8/61 | Huff | 23—204 |
| 3,007,768 | 11/61 | Edwards et al. | 23—14 |

FOREIGN PATENTS

| | | |
|---|---|---|
| 1,245,583 | 10/60 | France. |
| 864,253 | 3/61 | Great Britain. |

MAURICE A. BRINDISI, *Primary Examiner.*
BENJAMIN HENKIN, *Examiner.*

UNITED STATES PATENT OFFICE
CERTIFICATE OF CORRECTION

Patent No. 3,165,381                        January 12, 1965

Herbert Jenkner

It is hereby certified that error appears in the above numbered patent requiring correction and that the said Letters Patent should read as corrected below.

Column 4, line 44, for "+78° C." read -- -78° C. --.

Signed and sealed this 3rd day of August 1965.

(SEAL)
Attest:

ERNEST W. SWIDER
Attesting Officer

EDWARD J. BRENNER
Commissioner of Patents